(12) United States Patent  
Nagaoka et al.

(10) Patent No.: US 7,925,050 B2  
(45) Date of Patent: Apr. 12, 2011

(54) VEHICLE ENVIRONMENT MONITORING APPARATUS

(75) Inventors: Nobuharu Nagaoka, Saitama (JP); Hideki Hashimoto, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 838 days.

(21) Appl. No.: 11/974,819

(22) Filed: Oct. 16, 2007

(65) Prior Publication Data

US 2008/0260207 A1  Oct. 23, 2008

(30) Foreign Application Priority Data

Oct. 31, 2006  (JP) ................................ 2006-295420

(51) Int. Cl.  
*G06K 9/00*  (2006.01)

(52) U.S. Cl. .......................... 382/104; 382/100; 382/103

(58) Field of Classification Search .................. 382/100, 382/103, 104, 286; 340/630, 5, 61; 356/438; 250/221

See application file for complete search history.

(56) References Cited

U.S. PATENT DOCUMENTS

| | | | |
|---|---|---|---|
| 7,505,604 B2 * | 3/2009 | Zakrzewski et al. | 382/100 |
| 7,663,502 B2 * | 2/2010 | Breed | 340/825.72 |
| 7,729,510 B2 * | 6/2010 | Zakrzewski et al. | 382/100 |
| 2001/0028729 A1 | 10/2001 | Nishigaki et al. | |
| 2006/0115115 A1 | 6/2006 | Nagaoka et al. | |

FOREIGN PATENT DOCUMENTS

| | | |
|---|---|---|
| JP | 05-298591 | 11/1993 |
| JP | 2001-006096 | 1/2001 |
| JP | 2003-216937 | 7/2003 |

OTHER PUBLICATIONS

Broggi A. et al.: "Shape-based pedestrian Detection", Intelligent Vehicles Symposium, 2000. IV 2000. Proceedings of the IEEE Dearborn, MI USA Oct. 3-5, 2000, Piscataway, NJ, USA, IEEE, US, Oct. 3, 2000, pp. 215-220, XP010528939 ISBN: 0-7803-6363-9.

* cited by examiner

*Primary Examiner* — Anh Hong Do

(74) *Attorney, Agent, or Firm* — Carrier Blackman & Associates, P.C.; Joseph P. Carrier; William D. Blackman (57) ABSTRACT

A vehicle environment monitoring apparatus capable of extracting an image of a monitored object in an environment around a vehicle by separating the same from the background image with a simple configuration having a single camera mounted on the vehicle is provided. The apparatus includes a first image portion extracting processing unit to extract first image portions (A1, A2) considered to be the head of a pedestrian from a currently picked up image and a previously picked up image by an infrared camera, a mask area setting processing unit to set mask areas (M1(0,0), M1(1,0), . . . , M1(5,8)) around the first image portion (A1) in the currently picked up image, and an object extracting processing unit to carry out pattern matching for the previously picked up image by a comparison pattern obtained through affine transformation of each mask area at a change rate (Rate) between the first image portions (A1, A2), and to set an area (Ar1) including the first image portion (A2) and a second image portion (M2(1,3), M2(2,3), . . . , M2(3,6)) where a displacement amount between the position (black point) corresponding to the centroid of the mask area and the matching position is smaller than a predetermined threshold value to be an image area of the monitored object.

7 Claims, 10 Drawing Sheets

VEHICLE ENVIRONMENT MONITORING APPARATUS

BACKGROUND OF THE INVENTION

1. Field of the Invention

The present invention relates to a vehicle environment monitoring apparatus, a vehicle environment monitoring program, and a vehicle environment monitoring method for monitoring an environment around a vehicle by detecting a monitored object existing in the environment around the vehicle from an image obtained by a camera (imaging unit) mounted on the vehicle.

2. Description of the Related Art

There is conventionally proposed a vehicle environment monitoring apparatus that uses two cameras mounted on a vehicle to detect a distance between the vehicle and a monitored object according to the principle of trigonometrical survey, based on the displacement (parallax) of image portions of the same monitored object extracted from the images of the environment of the vehicle picked up by the respective cameras.

There is also proposed a vehicle environment monitoring apparatus that extracts an image area of a monitored object by determining that the areas of equal distance from the vehicle constitute an image portion of the same object, and determines a type of the monitored object (pedestrian, man-made structure or the like) based on the extracted image area (see, e.g., Japanese Patent Laid-Open No. 2003-216937). With such a conventional vehicle environment monitoring apparatus, the distance between the vehicle and the monitored object in the environment around the vehicle is calculated, and the image area of the monitored object is extracted, separate from the background image, based on the calculated distance.

When detecting the distance from the monitored object based on the parallax as described above, it is necessary to provide two cameras, which means an increased cost and a complicated structure and also requires a troublesome setting job to ensure precise adjustment of the optical axes of the two cameras.

SUMMARY OF THE INVENTION

In view of the foregoing, an object of the present invention is to solve the above-described problems and to provide a vehicle environment monitoring apparatus, a vehicle environment monitoring program and a vehicle environment monitoring method capable of detecting a monitored object in an environment around a vehicle by separating the same from a background, with a simple structure having a single camera mounted on the vehicle.

To achieve the above-described object, according to a first aspect of the present invention, there is provided a vehicle environment monitoring apparatus detecting a monitored object in an environment around a vehicle from an image picked up by a single camera mounted on the vehicle, which apparatus includes: a first image portion extracting processing unit (also referred as a first image portion extracting unit) to extract a first image portion having a predetermined feature value from each of a first picked-up image and a second picked-up image picked up by the camera at different time points; a second image portion extracting processing unit (also referred as a second image portion extracting unit) to extract, from each of the first and second picked-up images, a second image portion having a change rate of not greater than a predetermined level in relative positional relation with the first image portion between the first and second picked-up images; and an object detecting processing unit (also referred as an object detecting unit) to detect an area including the first and second image portions in the first or second picked-up image as an image area of the same monitored object in the environment around the vehicle.

According to the present invention, in the case where images are picked up by the camera at different time points while the vehicle is running or a monitored object such as a pedestrian is moving, the shape of the image of the monitored object would hardly change between the picked-up images, whereas the background image around the monitored object would greatly change. Thus, it can be determined that, in the first and second picked-up images picked up at different time points, the second image portion having the change rate of not greater than a predetermined level in relative positional relation with the first image portion (e.g., the image of the head of the pedestrian) is the image of the other portions of the same monitored object (e.g., the shoulder and leg portions of the pedestrian). Accordingly, the object detecting processing unit can detect the area including the first and second image portions as the image area of the same monitored object and separate the area from the background image.

Further, the vehicle environment monitoring apparatus is characterized in that it further includes a mask area setting processing unit (also referred as a mask area setting unit) to set a mask area in the first picked-up image in a predetermined position around the first image portion, and that the second image portion extracting processing unit extracts, as the second image portion, an image area in the second picked-up image where the degree of correlation with a feature value of the mask area is not less than a predetermined level and where an amount of displacement from a reference position with respect to the first image portion in the second picked-up image, corresponding to the position of the mask area with respect to the first image portion in the first picked-up image, is not greater than a predetermined value.

According to the present invention, in the second picked-up image, the image area where the degree of correlation with the feature value of the mask area is not less than a predetermined level and the displacement amount from the reference position is not greater than a predetermined value can be considered to be the image portion corresponding to the mask area in the first picked-up image. Thus, in this case, it can be determined that the relative positional relation between the first image portion and the mask area in the first picked-up image is also maintained between the first image portion and the above-described image area in the second picked-up image. Accordingly, the second image portion extracting processing unit can extract the above-described image area as the second image portion.

Further, the vehicle environment monitoring apparatus is characterized in that at least one of an area upward of the first image portion and an area downward of the first image portion is defined as the mask area.

According to the present invention, it is possible to efficiently detect the monitored object elongated in the vertical direction from the road surface, like a pedestrian.

Further, the vehicle environment monitoring apparatus is characterized in that at least one of an area leftward of the first image portion and an area rightward of the first image portion is defined as the mask area.

According to the present invention, it is possible to efficiently detect the monitored object elongated in the direction parallel to the road surface, like a vehicle.

Further, the vehicle environment monitoring apparatus is characterized in that the camera is an infrared camera, that the first image portion extracting processing unit extracts the first image portion from an infrared gray scale image picked up by the camera, and that the second image portion extracting processing unit extracts the second image portion by correlation processing with the mask area in the gray scale image.

According to the present invention, since the infrared camera is provided as the camera described above, it is readily possible to detect, from the infrared gray scale image, the image portion of the heat-radiating portion such as the head of the pedestrian or the headlight of the vehicle as the first image portion, and the image portion of the heat-radiating portion such as the arm or leg portion of the pedestrian or the bonnet or the like of the vehicle as the second image portion.

Further, the vehicle environment monitoring apparatus is characterized in that it further includes: a real space distance grasping processing unit (also referred as a real space distance grasping unit) to grasp a distance between the vehicle and a position in a real space corresponding to the image area including the first and second image portions; and an object type determining processing unit (also referred as an object type determining unit) to calculate a size of the object in the real space corresponding to the image area including the first and second image portions using the distance grasped by the real space distance grasping processing unit, and to determine a type of the object based on the size.

According to the present invention, the distance between the vehicle and the position in the real space corresponding to the image area including the first and second image portions, grasped by the real space distance grasping processing unit, can be used by the object type determining processing unit to determine the type of the object based on the size of the object in the real space corresponding to the image area, and therefore, it is possible to carry out the processing (e.g., change of the content of the warning to the driver) in accordance with the type of the object.

Further, the vehicle environment monitoring apparatus is characterized in that the object type determining processing unit calculates at least one of a height and a width of the object in the real space as the size of the object in the real space corresponding to the image area including the first and second image portions.

According to the present invention, the object type determining processing unit can determine the type of the object by the height or the width in accordance with the shape of the object in the real space corresponding to the image area including the first and second image portions.

Furthermore, according to a second aspect of the present invention, there is provided a vehicle environment monitoring apparatus that includes a computer having an interface circuit for accessing data of an image picked up by a single camera mounted on a vehicle, and detects a monitored object in an environment around the vehicle by the computer, wherein the computer executes: first image portion extracting processing of extracting a first image portion having a predetermined feature value from each of a first picked-up image and a second picked-up image picked up by the camera at different time points; second image portion extracting processing of extracting, from each of the first and second picked-up images, a second image portion having a change rate of not greater than a predetermined level in relative positional relation with the first image portion between the first and second picked-up images; and object detecting processing of detecting an area including the first and second image portions in the first or second picked-up image as an image area of the same monitored object in the environment around the vehicle.

According to the present invention, in the case where images are picked up by the camera at different time points while the vehicle is running or a monitored object such as a pedestrian is moving, the shape of the image of the monitored object would hardly change between the picked-up images, whereas the background image around the monitored object would greatly change. Thus, it can be determined that, in the first and second picked-up images picked up at different time points, the second image portion having the change rate of not greater than a predetermined level in relative positional relation with the first image portion (e.g., the image of the head of the pedestrian) is the image of the other portions of the same monitored object (e.g., the shoulder and leg portions of the pedestrian).

Accordingly, the computer executes the first image portion extracting processing to extract the first image portion and executes the second image portion extracting processing to extract the second image portion. Then, the computer executes the object detecting processing, so that it can detect the area including the first and second image portions as the image area of the same monitored object and separate the area from the background image.

Furthermore, according to a vehicle having mounted thereon the vehicle environment monitoring apparatus of the first or second aspect described above, it is possible to accurately determine the type of the object existing in the environment around the vehicle.

According to the present invention, there is also provided a vehicle environment monitoring program for causing a computer having an interface circuit for accessing data of an image picked up by a single camera mounted on a vehicle to implement a function of detecting a monitored object in an environment around the vehicle from the image, wherein the program causes the computer to serve as: a first image portion extracting processing unit to extract a first image portion having a predetermined feature value from each of a first picked-up image and a second picked-up image picked up by the camera at different time points; a second image portion extracting processing unit to extract, from each of the first and second picked-up images, a second image portion having a change rate of not greater than a predetermined level in relative positional relation with the first image portion between the first and second picked-up images; and an object detecting processing unit to detect an area including the first and second image portions in the first or second picked-up image as an image area of the same monitored object in the environment around the vehicle.

By causing the computer to execute the program of the present invention, it is possible to implement the configurations of the first image portion extracting processing unit, the second image portion extracting processing unit and the object detecting processing unit in the above-described vehicle environment monitoring apparatus of the present invention.

According to the present invention, there is also provided a vehicle environment monitoring method for detecting a monitored object in an environment around a vehicle by a computer having an interface circuit for accessing data of an image picked up by a single camera mounted on the vehicle, wherein the method includes: a first image portion extracting step, executed by the computer, of extracting a first image portion having a predetermined feature value from each of a first picked-up image and a second picked-up image picked up by the camera at different time points; a second image portion extracting step, executed by the computer, of extracting, from each of the first and second picked-up images, a second image portion having a change rate of not greater than a predetermined level in relative positional relation with the first image portion between the first and second picked-up images; and an object detecting step, executed by the computer, of detecting an area including the first and second image portions in the first or second picked-up image as an image area of the same monitored object in the environment around the vehicle.

According to the present invention, the computer executes the first image portion extracting step to extract the first image portion from each of the first and second picked-up images, and executes the second image portion extracting step to extract the second image portion from each of the first and second picked-up images. In this case, similarly as in the case of the vehicle environment monitoring apparatus of the present invention described above, it can be determined that, in the first and second picked-up images picked up at different time points, the second image portion having the change rate of not greater than a predetermined level in relative positional relation with the first image portion (e.g., the image of the head portion of the pedestrian) is the image of the other portions of the same monitored object (e.g., the shoulder and leg portions of the pedestrian). Accordingly, when the computer executes the object detecting step, it is possible to detect the image area including the first and second image portions as the image area of the same monitored object, separate the image area from the background image.

BRIEF DESCRIPTION OF THE DRAWINGS

FIGS. 6(a) and 6(b) illustrate a way of setting mask areas around a first image portion in all directions, in which

FIGS. 7(a) and 7(b) illustrate a way of setting the mask areas to the left and the right of the first image portion, in which FIG. 7(a) shows mask areas set to the left and right of the first image portion, and FIG. 7(b) shows pattern matching by the comparison pattern.

FIGS. 8(a) and 8(b) illustrate a way of setting the mask areas above and below the first image portion, in which FIG. 8(a) shows mask areas set above and below the first image portion, and FIG. 8(b) shows pattern matching by the comparison pattern.

FIGS. 10(a) and 10(b) illustrate processing of estimating a movement vector of the monitored object in the real space, in which

DESCRIPTION OF THE PREFERRED EMBODIMENTS

An embodiment of the present invention will now be described with reference to FIGS. 1-10.

Figure 1:
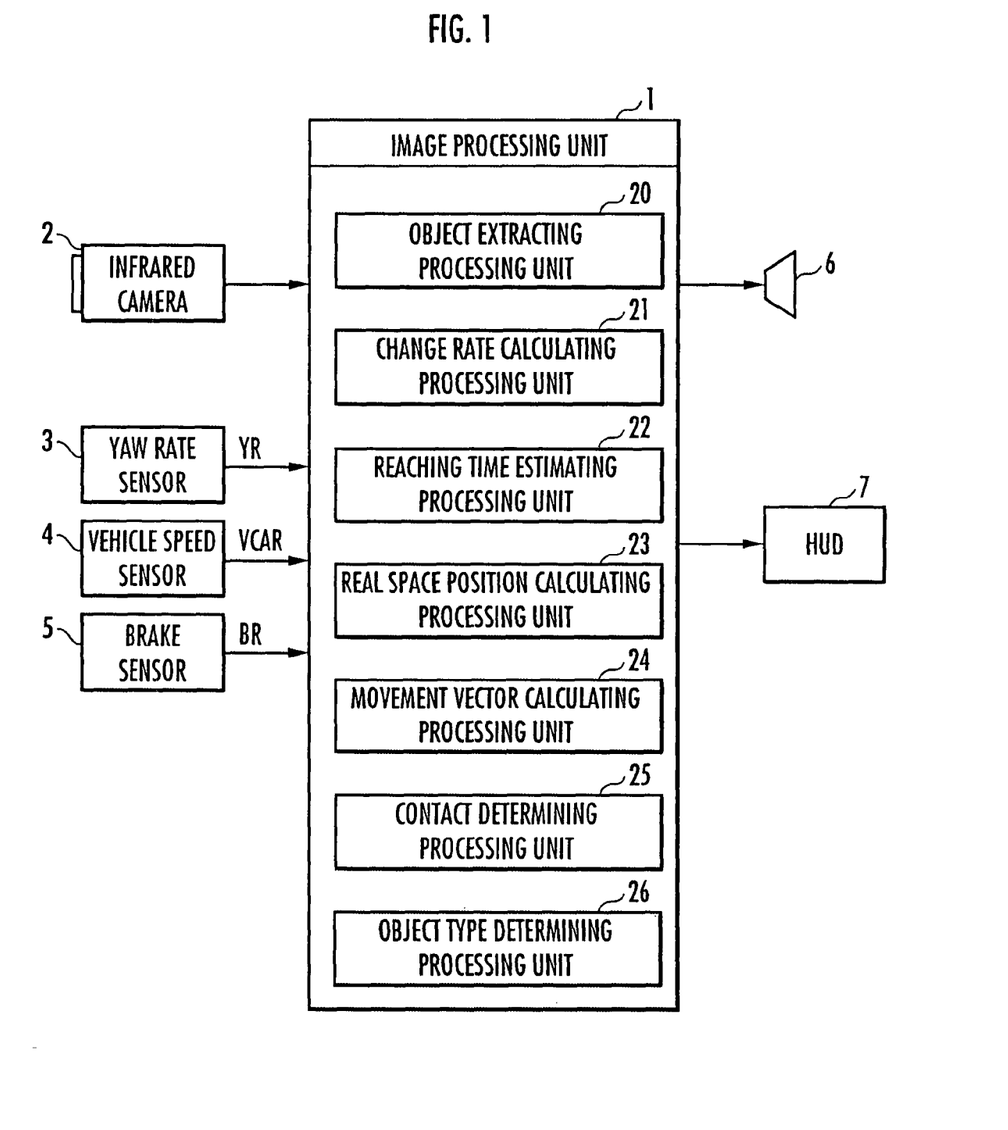
FIG. 1 is a configuration diagram of a vehicle environment monitoring apparatus of the present invention.

Referring to FIG. 1, a vehicle environment monitoring apparatus of the present invention includes: one infrared camera 2 (also referred as an imaging unit 2) (corresponding to the camera of the present invention) capable of detecting far-infrared rays; a yaw rate sensor 3 detecting the yaw rate of the vehicle; a vehicle speed sensor 4 detecting a traveling speed of the vehicle; a brake sensor 5 detecting an operation amount of a brake pedal by a driver; an image processing unit 1 detecting a monitored object (pedestrian or the like) in front of the vehicle based on an image obtained by the infrared camera 2 and outputting a warning when the monitored object would likely come into contact with the vehicle; a speaker 6 for generating the warning by sound; and a head up display (hereinafter, referred to as "HUD") 7 for displaying the image obtained by the infrared camera 2 and also providing a display to cause the driver to visually recognize the monitored object that would likely come in contact with the vehicle.

Figure 2:
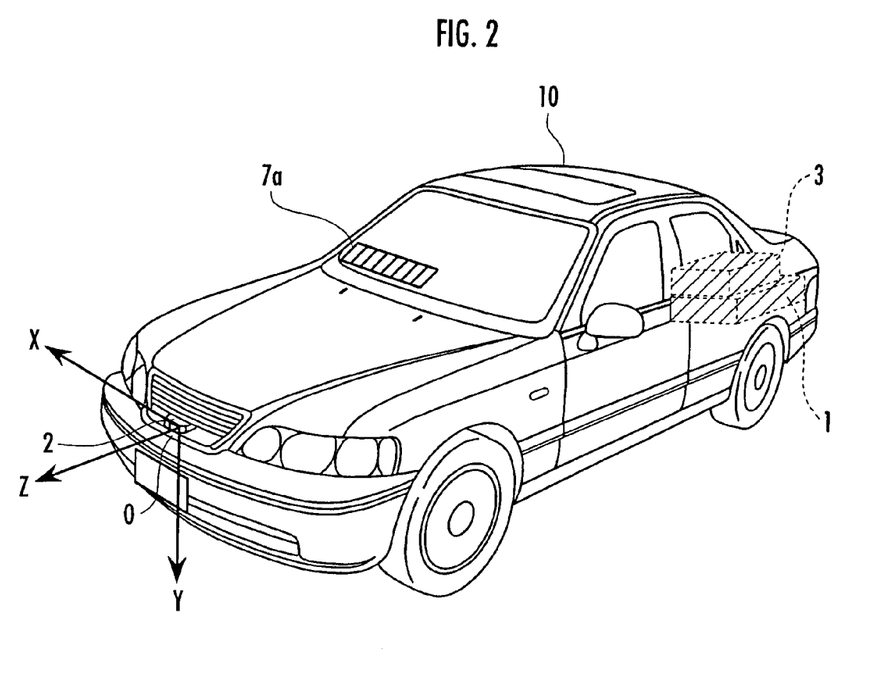
FIG. 2 illustrates how the vehicle environment monitoring apparatus shown in FIG. 1 is attached to a vehicle.

Referring to FIG. 2, the infrared camera 2 is arranged in a front portion of the vehicle 10, and has a characteristic that the output level becomes higher (i.e., luminance increases) as the temperature of the picked-up object becomes higher. Further, the HUD 7 is arranged such that a screen 7a thereof is displayed in a front window of the vehicle 10 at a location in front of the driver.

Further, referring to FIG. 1, the image processing unit 1 is an electronic unit which includes an image input circuit (not shown) that converts an analog video signal output from the infrared camera 2 to digital data to be taken into an image memory (not shown) and an interface circuit (not shown) for accessing (reading and writing) the image data taken into the image memory, and is provided with a computer (an arithmetic processing circuit composed of a CPU, memory, input/output circuit and the like, or a microcomputer having these functions aggregated therein) that performs various arithmetic processing on the image of the scene in front of the vehicle taken into the image memory.

When the computer is caused to execute the vehicle environment monitoring program of the present invention, the computer functions as: an object extracting processing unit 20 (including the functions of the first image portion extracting processing unit (also referred as the first image portion extracting unit), the second image portion extracting processing unit (also referred as the second image portion extracting unit), the mask area setting processing unit (also referred as the mask area setting unit), and the object detecting processing unit (also referred as the object detecting unit) of the present invention) that extracts an image area of a monitored object from the image of the scene in front of the vehicle taken into the image memory; a change rate calculating processing unit 21 (also referred as a change rate calculating unit 21) that calculates a change rate Rate in size of the image portions of the same monitored object between the images picked up at a predetermined interval; a reaching time estimating processing unit 22 (also referred as an object reaching time estimating unit 22) that uses the change rate Rate to estimate the time T until the monitored object reaches the vehicle 10; a real space position calculating processing unit 23 (including the function of the real space distance grasping processing unit (also referred as the real space distance grasping unit) of the present invention) that calculates the position of the monitored object in a real space; a movement vector calculating processing unit 24 that calculates a movement vector of the monitored object in the real space; a contact determining processing unit 25 that determines a possibility of contact of the monitored object with the vehicle 10 based on the movement vector; and an object type determining processing unit 26 (also referred as an object type determining unit 26) that determines the type of the monitored object.

The first image portion extracting processing, the second image portion extracting processing, and the object detecting processing of the present invention are carried out by the processing units described above.

Further, the first image portion extracting step, the second image portion extracting step, and the object detecting step of the vehicle environment monitoring method of the present invention are carried out by the processing units described above.

Figure 3:
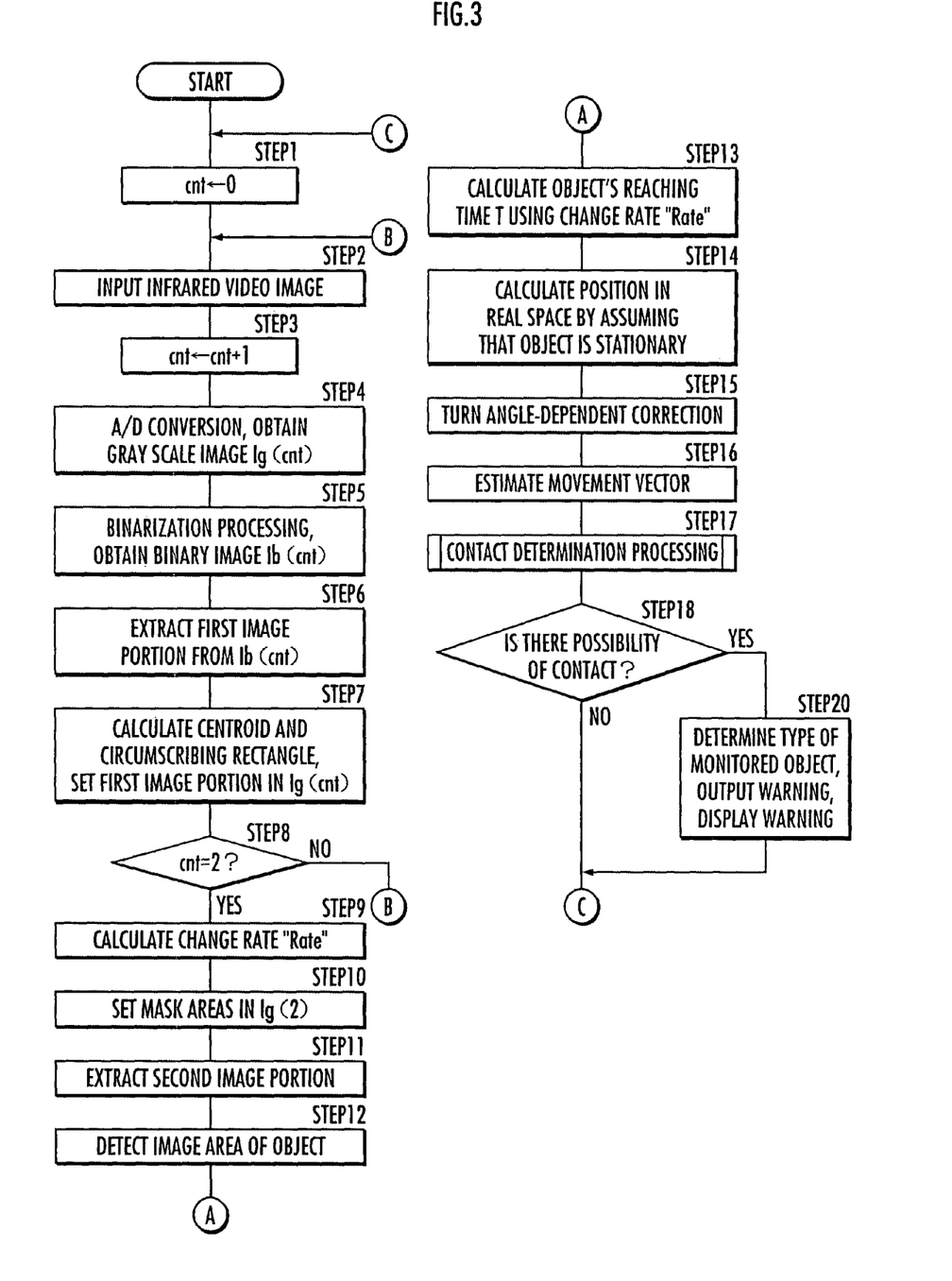
FIG. 3 is a flowchart illustrating a series of processing by an image processing unit shown in FIG. 1.

Hereinafter, procedures of the processing of detecting a monitored object and the processing of determining contact between the vehicle and the monitored object by the image processing unit 1 will be described with reference to the flowchart shown in FIG. 3.

In STEP 1, the image processing unit 1 firstly clears a counter variable cnt (cnt=0). In the following STEP 2, the image processing unit 1 inputs an infrared video signal from the infrared camera 2 and increments the counter variable cnt by 1 (cnt←cnt+1) (STEP 3).

In the following STEP 4, the image processing unit 1 takes into the image memory a gray scale image having the infrared video signal (analog signal) converted into digital gray scale (luminance) data. In the following STEP 5, the image processing unit 1 obtains a binary image by performing binarization processing on each pixel of the gray scale image to set the pixel having the luminance of not less than a predetermined threshold value to "1" (white) and the pixel having the luminance of less than the threshold value to "0" (black).

The subsequent STEPS 6, 7, and 10-12 are performed by the object extracting processing unit 20. In STEP 6, the object extracting processing unit 20 extracts, from the binary image, an image portion corresponding to a specific site of the monitored object (for example, the head of a pedestrian) as a first image portion. More specifically, run length data is calculated for each white area in the binary image, to perform labeling processing to collectively label the areas having overlapping portions in the horizontal direction. Then, it extracts from the labeled areas any area having a preset feature value (corresponding to the predetermined feature value of the present invention) as the first image portion.

In the following STEP 7, the object extracting processing unit 20 calculates a centroid of and a rectangle circumscribing the first image portion in the binary image. Then, the object extracting processing unit 20 sets an area of the first image portion in the gray scale image, based on the positions of the centroid and the circumscribing rectangle of the first image portion in the binary image.

The configuration of the object extracting processing unit 20 setting the first image portion in the gray scale image Ig(cnt) in STEPS 6 and 7 corresponds to the first image portion extracting processing unit of the present invention, and the processing of setting the first image portion in the gray scale image Ig(cnt) by the object extracting processing unit 20 corresponds to the first image portion extracting step of the present invention.

In the following STEP 8, the image processing unit 1 determines whether the counter variable cnt is 2. If the counter value cnt is not 2 (i.e., when cnt=1), the process proceeds to STEP 2, and the image processing unit 1 repeats the processing in STEPS 2-7 to set the areas of the first image portions in the gray scale image Ig(1) and the gray scale image Ig(2) (corresponding to the first picked-up image of the present invention) at different time points.

If the counter variable cnt is 2 in STEP 8, i.e., when the areas of the first image portions have been set for the gray scale images Ig(1) and Ig(2) at the different time points, the process proceeds to STEP 9. STEP 9 is carried out by the change rate calculating processing unit 21, wherein the change rate calculating processing unit 21 calculates a change rate Rate in size between the first image portion in the gray scale image Ig(1) and the first image portion in the gray scale image Ig(2).

Figure 4:
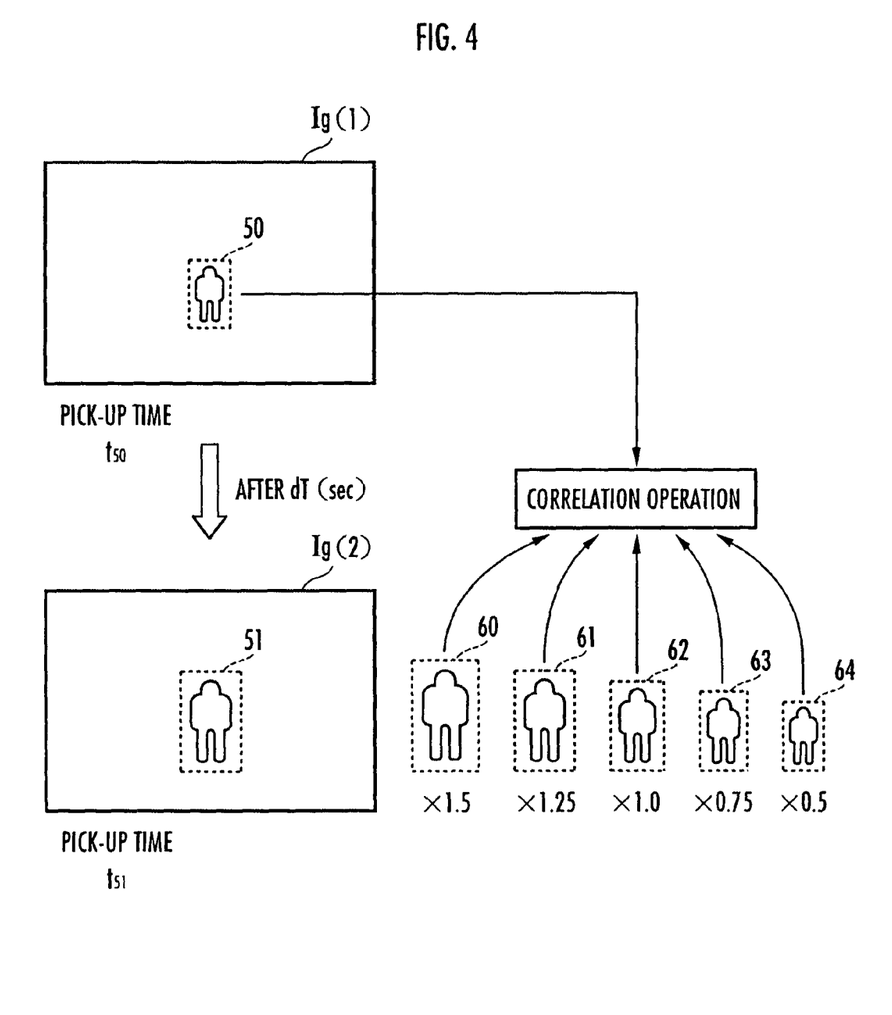
FIG. 4 illustrates processing of calculating a change rate in size of the image of the monitored object by a correlation operation between time-series images.

FIG. 4 illustrates a way of calculating the change rate Rate by the change rate calculating processing unit 21. Shown in FIG. 4 are the first image portion 50 in the gray scale image Ig(1) at a time $t_{50}$ and the first image portion 51 in the gray scale image Ig(2) at a time $t_{51}$ (the pick-up time in the control cycle following the control cycle corresponding to the time $t_{50}$).

The change rate calculating processing unit 21 reduces the size of the first image portion 51 (when the monitored object is approaching the vehicle) or increases the size of the first image portion 51 (when the monitored object is moving away from the vehicle) in the gray scale image Ig(2) at the time $t_{51}$ by affine transformation, to calculate the degree of correlation with the first image portion 50 in the gray scale image Ig(1) at the time $t_{50}$. Specifically, as shown in the figure, the degree of correlation with the first image portion 50 in the gray scale image Ig(1) is calculated for each of an image 60 scaled to 1.5 times the size of the first image portion 51, an image 61 scaled to 1.25 times, an image 62 scaled to 1.0 time, an image 63 scaled to 0.75 time, and an image 64 scaled to 0.5 time. The change rate calculating processing unit 21 then determines the scaling factor of the first image portion 51 when the degree of correlation becomes highest as the change rate Rate.

Figure 5:
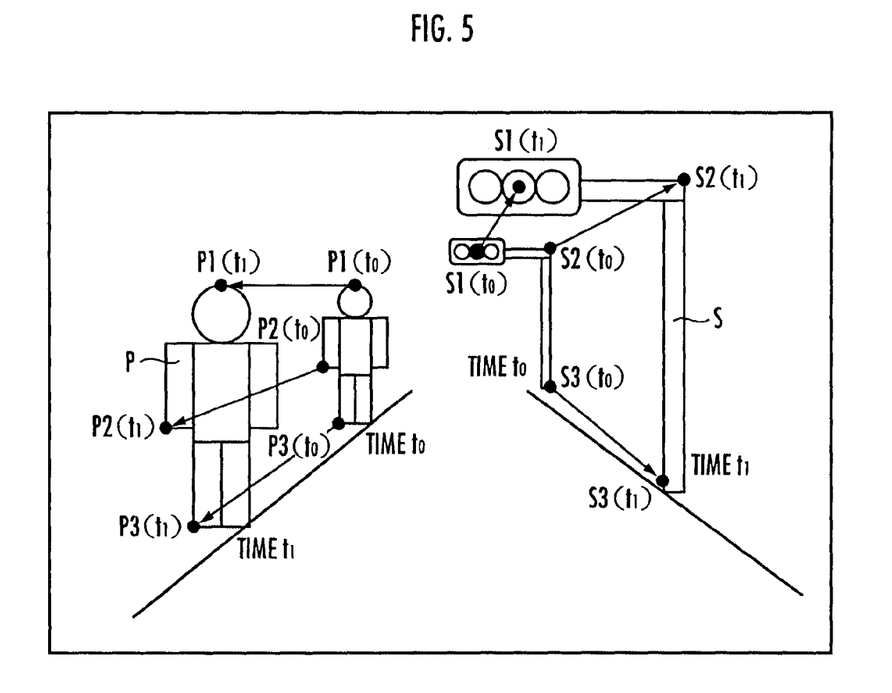
FIG. 5 illustrates a relative positional relation between the image portions of the monitored object in the time-series images.

FIG. 5 shows images P of the same pedestrian and images S of the same traffic signal picked up at different times $t_0$ and $t_1$ (where $t_0$ precedes $t_1$). It is considered that the relative positional relation among the head portion $P1(t_1)$, the hand portion $P2(t_1)$ and the foot portion $P3(t_1)$ of the image of the pedestrian at the time $t_1$ would hardly change from the relative positional relation among the head portion $P1(t_0)$, the hand portion $P2(t_0)$ and the foot portion $P3(t_0)$ of the image of the pedestrian at the time to, except for the size.

Similarly, for the images S of the traffic signal, it is considered that the relative positional relation among the lighting portion $S1(t_1)$, the upper end of the pole $S2(t_1)$ and the lower end of the pole $S3(t_1)$ of the image of the traffic signal at the time $t_1$ would hardly change from the relative positional relation among the lighting portion $S1(t_0)$, the upper end of the pole $S2(t_0)$ and the lower end of the pole $S3(t_0)$ of the image of the traffic signal at the time to, except for the size.

Thus, the object extracting processing unit 20 extracts, as a second image portion, the image portion where the change rate in relative positional relation with the first image portion is not greater than a predetermined level between the gray scale images Ig(1) and Ig(2) at different time points and where the degree of correlation of the feature value is not lower than a predetermined level. The object extracting processing unit 20 then detects the area including the first and second image portions as an image area of the same monitored object, by separating the area from the background image.

Firstly, in STEP 10, the object extracting processing unit 20 sets mask areas around the first image portion in the gray scale image Ig(2). Specifically, as shown in FIG. 6(a), it sets 50 mask areas M1 (M1(0,0), M1(1,0), . . . , M1(5,8)) in the form of a matrix around the first image portion A1. It is noted that the black point in each mask area shows the position of centroid thereof. Further, the configuration of the object extracting processing unit 20 setting the mask areas in STEP 10 corresponds to the mask area setting processing unit of the present invention.

In the following STEP 11, the object extracting processing unit 20 extracts the second image portion from the gray scale image Ig(1). Specifically, for the comparison pattern obtained through affine transformation of the mask areas M1(0,0) through M1(5,8) shown in FIG. 6(a) at the change rate Rate, it carries out pattern matching with respect to the gray scale image Ig(2).

FIG. 6(b) shows a result of the pattern matching, where 12 areas, M2(1,3), M2(2,3), M2(3,3), M2(4,3), M2(1,4), M2(2, 4), M2(3,4), M2(4,4), M2(2,5), M2(3,5), M2(2,6), and M2(3, 6), including an image B2 corresponding to an image B1 of the body and leg portions of the pedestrian in FIG. 6(a) are extracted. For example, the area M2(1,3) in FIG. 6(b) indicates the area extracted from the comparison pattern obtained by affine transformation of the mask area M1(1,3) in FIG. 6(a), and the area M2(4,3) in FIG. 6(b) indicates the area extracted from the comparison pattern obtained through affine transformation of the mask area M1(4,3) in FIG. 6(a).

The black points in FIG. 6(b) show the positions corresponding to the centroids of the respective mask areas M1(1, 3), M1(2,3), M1(3,3), M1(4,3), M1(1,4), M1(2,4), M1(3,4), M1(4,4), M1(2,5), M1(3,5), M1(2,6), and M1(3,6) in FIG. 6(a) (i.e., the centroid positions of the mask areas M1 reduced in size by the change rate Rate, with respect to the first image portion A2). Further, the x points in FIG. 6(b) show the positions of the centroids of the respective areas M2 extracted by the pattern matching.

The object extracting processing unit 20 uses the following expression (1) to determine whether a displacement amount D of the centroid position (xm(i,j), ym(i,j)) of each area, extracted by the pattern matching, from the centroid position (xb(i,j), yb(i,j)) of the corresponding mask area is smaller than a threshold value TH. Here, i,j represents an index of the mask area.

$$D=\{xb(i,j)-xm(i,j)\}^2+\{yb(i,j)-ym(i,j)\}^2<TH \quad (1)$$

where D represents the amount of displacement between the centroid position corresponding to the mask area and the centroid position of the area extracted by the pattern matching, and TH represents the threshold value.

The object extracting processing unit 20 then extracts the area having the displacement amount D smaller than the threshold value TH as the second image portion. In the example shown in FIG. 6(b), 12 areas including the image B2 of the body and leg portions of the pedestrian are extracted as the second image portion. It is noted that the configuration of the object extracting processing unit 20 extracting the second image portion in STEP 11 corresponds to the second image portion extracting processing unit of the present invention. Further, the processing of extracting the second image portion by the object extracting processing unit 20 corresponds to the second image portion extracting step of the present invention.

In the following STEP 12, the object extracting processing unit 20 detects the area including the first and second image portions as the image area of the same monitored object. In the example shown in FIG. 6(b), the area Ar1 including the first image portion A2 as well as the second image portion corresponding to M2(1,3), M2(2,3), M2(3,3), M2(4,3), M2(1,4), M2(2,4), M2(3,4), M2(4,4), M2(2,5), M2(3,5), M2(2,6), and M2(3,6) is detected as the image area Ar1 of the monitored object. It is noted that the configuration of the object extracting processing unit 20 detecting the area including the first and second image portions as the image area of the same monitored object corresponds to the object detecting processing unit of the present invention. Further, the processing of detecting the area including the first and second image portions as the image area of the same monitored object by the object extracting processing unit 20 corresponds to the object detecting step of the present invention.

While the mask areas M1(0,0) through M1(5,8) are set in the form of a matrix to surround the first image portion A1 from all the directions in FIG. 6(a), in the case where the monitored object is restricted, the mask areas may be set to conform to the shape of the monitored object, so as to efficiently extract the second image portion.

For example, FIGS. 7(a) and 7(b) show a way of setting the mask areas in the case where the object is a vehicle which is elongated in the horizontal direction. In this case, as shown in FIG. 7(a), mask areas M3(0), M3(1), . . . , M3(6) are set to the left and right of the first image portion (near the headlight on the right side of the vehicle) A3. In the figure, yb1 represents a horizontal line passing the centroid of the first image portion A3.

In this case, as shown in FIG. 7(b), it is only necessary to carry out pattern matching by the comparison pattern obtained by affine transformation of the mask areas M3(0) through M3(6) at the change rate Rate, exclusively in the lateral direction of the first image portion A4, which can shorten the time required for the pattern matching processing. It is then possible, as shown in FIG. 7(b), to extract the areas M4(1) through M4(5) including the image B4 of the vehicle as the second image portion, and to detect the area including the second image portion and the first image portion A4 as the image area Ar2 of the monitored object. In the figure, yb2 represents a horizontal line passing the centroid of the first image portion A4.

Further, FIGS. 8(a) and 8(b) show a way of setting the mask areas in the case where the object is a pedestrian that is elongated in the vertical direction. In this case, mask areas M5(0), M5(1), . . . , M5(9) are set above and below the first image portion (head portion of the pedestrian) A5, as shown in FIG. 8(a). In the figure, xb1 represents a vertical line passing the centroid of the first image portion A5.

In this case, as shown in FIG. 8(b), it is only necessary to carry out the pattern matching by the comparison pattern obtained by subjecting the mask areas M5(0) through M5(9) to affine transformation at the change rate Rate, exclusively in the vertical direction of the first image portion A6, which shortens the time required for the pattern matching processing. Further, it is possible, as shown in FIG. 8(b), to extract the areas M6(3) through M6(6) including the image B6 of the body and leg portions of the pedestrian as the second image portion, and to detect the area Ar3 including the second image portion and the first image portion as the image area of the monitored object. In the figure, xb2 represents a vertical line passing the centroid of the first image portion A6.

The processing in the following STEP 13 is carried out by the reaching time estimating processing unit 22. Hereinafter, description will be made, with reference to FIG. 9, about a way of estimating a time T until the monitored object reaches the vehicle 10 (hereinafter, this time T will be referred to as the "object's reaching time") using the change rate Rate, which is carried out by the reaching time estimating processing unit 22. In the figure, Im1 represents an image picked up by the infrared camera 2 at the pick-up time $t_{10}$, and Im2 represents an image picked up by the infrared camera 2 at the pick-up time $t_{11}$ after a lapse of dT from the time $t_{10}$.

Figure 9:
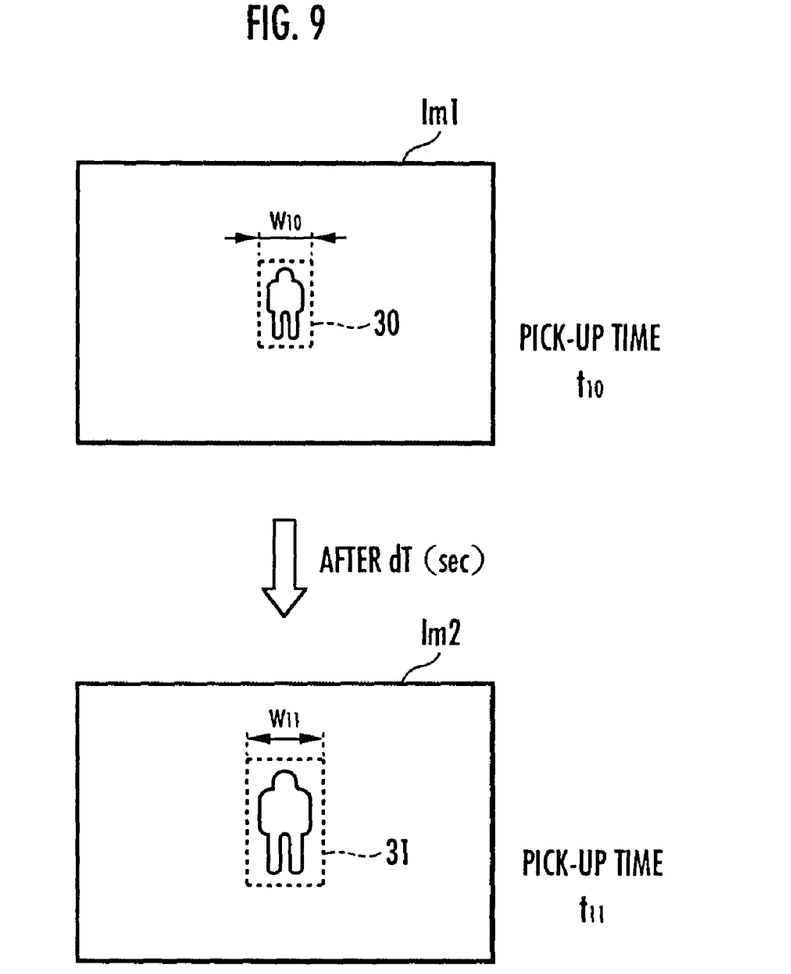

The image Im1 includes an image portion 30 of the pedestrian picked up as the monitored object, and the image Im2 includes an image portion 31 of the same pedestrian. FIG. 9 illustrates the state where the pedestrian is walking toward the vehicle 10, and the pedestrian is closer to the vehicle 10 at the pick-up time $t_{11}$ of the image Im2 than at the pick-up time $t_{10}$ of the image Im1. Thus, the image portion 31 of the pedestrian in the image Im2 has a width $w_{11}$ greater than the width $w_{10}$ of the image portion 30 of the pedestrian in the image Im1.

In this case, the change rate Rate and the object's reaching time T have the relation indicated by the following expression (2), and thus, the object's reaching time T can be calculated from the change rate Rate using the following expression (3). It is then possible to determine the possibility of contact between the vehicle 10 and the monitored object based on the object's reaching time T.

$$\text{Rate} = \frac{w_{10}(\text{previous})}{w_{11}(\text{current})} = \frac{f \cdot W / Z_0}{f \cdot W / Z_1} \quad (2)$$
$$= \frac{Z_1}{Z_0} = \frac{Z_1}{Z_1 + V_s \cdot dT}$$
$$= \frac{V_s \cdot T}{V_s \cdot T + V_s \cdot dT}$$
$$= \frac{1}{1 + dT/T}$$

where $w_{11}$ represents the width of the image portion of the monitored object at the current pick-up time (pick-up time $t_{11}$); $w_{10}$ represents the width of the image portion of the monitored object at the previous pick-up time (pick-up time $t_{10}$); f represents a focal distance of the infrared camera 2; W represents a width of the monitored object in a real space; $Z_1$ represents a distance from the vehicle 10 to the monitored object at the current pick-up time (pick-up time $t_{11}$); $Z_0$ represents a distance from the vehicle 10 to the monitored object at the previous pick-up time (pick-up time $t_{10}$); Vs represents a relative speed between the vehicle and the monitored object; dT represents an interval between the pick-up times; and T represents the object's reaching time.

$$T = \frac{dT \cdot \text{Rate}}{1 - \text{Rate}} \quad (3)$$

where T represents the object's reaching time; dT represents an interval between the pick-up times; and Rate represents the change rate.

The following STEP 14 is carried out by the real space position calculating processing unit 23. The real space position calculating processing unit 23 calculates the distance $Z_1$ to the monitored object at the current time using the following expression (5). To obtain the expression (5), the above expression (2) is transformed into the following expression (4), and in the expression (4), the relative speed Vs between the vehicle 10 and the monitored object (Vs=the traveling speed Vj of the vehicle+the moving speed Vd of the monitored object) is replaced with the traveling speed Vj of the vehicle, considering that the speed Vj of the vehicle 10 is sufficiently higher than the moving speed Vd of the monitored object.

$$\text{Rate} = \frac{Z_1}{Z_1 + V_s \cdot dT} \quad (4)$$

where Rate represents the change rate; $Z_1$ represents the distance to the monitored object at the current time; Vs represents the relative speed of the vehicle and the monitored object; and dT represents an interval between the pick-up times.

$$Z_1 = \frac{\text{Rate} \cdot V_j \cdot dT}{1 - \text{Rate}} \quad (5)$$

where $Z_1$ represents the distance to the monitored object at the current time; Rate represents the change rate; Vj represents the traveling speed of the vehicle; and dT represents an interval between the pick-up times.

Further, the real space position calculating processing unit 23 calculates the distance $Z_0$ to the monitored object at the previous pick-up time using the following expression (6).

$$Z_0 = Z_1 + V_j \cdot dT \quad (6)$$

where $Z_0$ represents the distance to the monitored object at the previous pick-up time; $Z_1$ represents the distance to the monitored object at the current pick-up time; Vj represents the traveling speed of the vehicle; and dT represents an interval between the pick-up times.

As such, the real space position calculating processing unit 23 calculates the distance $Z_1$ from the vehicle 10 to the monitored object at the current pick-up time and the distance $Z_0$ from the vehicle 10 to the monitored object at the previous pick-up time using the above expressions (5) and (6). Then, the real space position calculating processing unit 23 calculates the positions of the monitored object in the real space at the current and previous pick-up times, based on the positions of the areas corresponding to the monitored object in the binary images at the current and previous pick-up times.

FIG. 10(a) shows a position Pi_0 ($x_{10}$, $y_{10}$) where the monitored object was extracted at the previous time and a position Pi_1 ($x_{11}$, $y_{11}$) where the monitored object was extracted at the current time on an image Im5, with the vertical axis y being aligned with the vertical direction of the image and the horizontal axis x being aligned with the horizontal direction of the image.

Further, FIG. 10(b) illustrates the state of movement of the monitored object in a real space, with the Z axis being set in the traveling direction of the vehicle 10, and the X axis being set in the direction orthogonal to the Z axis. In the figure, Pr_0 ($X_{10}$, $Y_{10}$, $Z_{10}$) represents the position of the monitored object at the previous pick-up time, and Pr_1 ($X_{11}$, $Y_{11}$, $Z_{11}$) represents the position of the monitored object at the current pick-up time. Further, Vm is a movement vector of the monitored object estimated from Pr_0 and Pr_1.

The real space position calculating processing unit 23 calculates the real space coordinate Pr_0 ($X_{10}$, $Y_{10}$, $Z_{10}$) of the monitored object at the previous pick-up time using the following expression (7), and calculates the real space coordinate Pr_1 ($X_{11}$, $Y_{11}$, $Z_{11}$) of the monitored object at the current pick-up time using the following expression (8).

$$\begin{cases} X_{10} = \dfrac{x_{10} \cdot Z_0}{f} \\ Y_{10} = \dfrac{y_{10} \cdot Z_0}{f} \end{cases} \quad (7)$$

where $X_{10}$, $Y_{10}$ represent the real space coordinate values of the monitored object at the previous pick-up time; $x_{10}$, $y_{10}$ represent the image coordinate values of the area corresponding to the monitored object in the previously picked up image; $Z_0$ represents the distance from the vehicle to the monitored object at the previous pick-up time; and f represents a focal distance of the infrared camera.

$$\begin{cases} X_{11} = \dfrac{x_{11} \cdot Z_1}{f} \\ Y_{11} = \dfrac{y_{11} \cdot Z_1}{f} \end{cases} \quad (8)$$

where $X_{11}$, $Y_{11}$ represent the real space coordinate values of the monitored object at the current pick-up time; $x_{11}$, $y_{11}$ represent the image coordinate values of the area corresponding to the monitored object in the binary image of the currently picked up image; $Z_1$ represents the distance from the vehicle to the monitored object at the current pick-up time; and f represents a focal distance of the infrared camera.

Further, in the following STEP 15, the real space position calculating processing unit 23 carries out turn angle-dependent correction, where the displacement in position on the image due to turning of the vehicle 10 is corrected based on the angle of turn recognized from a detection signal YR of the yaw rate sensor 3. More specifically, when the angle of turn of the vehicle 10 from the previous pick-up time to the current pick-up time is θr, the real space coordinate values are corrected based on the following expression (9).

$$\begin{bmatrix} Xr \\ Yr \\ Zr \end{bmatrix} = \begin{bmatrix} \cos\theta r & 0 & -\sin\theta r \\ 0 & 1 & 0 \\ \sin\theta r & 0 & \cos\theta r \end{bmatrix} \begin{bmatrix} Xo \\ Yo \\ Zo \end{bmatrix} \quad (9)$$

where Xr, Yr, Zr represent the real space coordinate values after the turn angle-dependent correction; θr represents the angle of turn; and $X_0$, $Y_0$, $Z_0$ represent the real space coordinate values before the turn angle-dependent correction.

Figure 10:
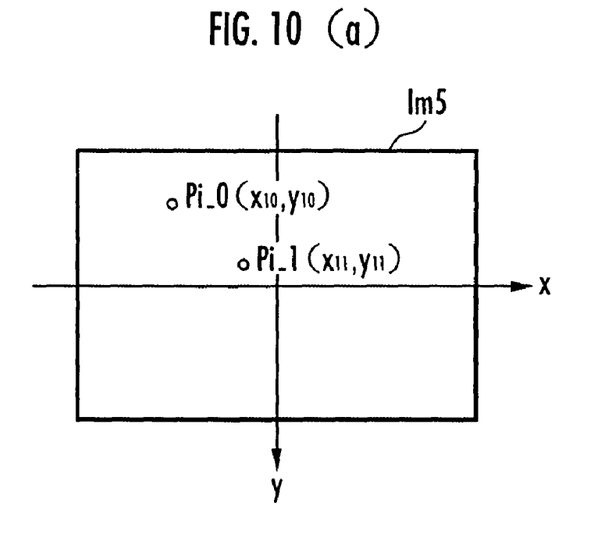
FIG. 10(a) shows positions of the monitored object extracted at the previous time and at the current time.
FIG. 10(b) shows state of movement of the monitored object in a real space.

The following STEP 16 is carried out by the movement vector calculating processing unit 24. As shown in FIG. 10(*b*), the movement vector calculating processing unit 24 obtains an approximate straight line Vm corresponding to the relative movement vector of the monitored object and the vehicle 10, from the real space positions Pr_0 and Pr_1 of the same monitored object at the previous and current pick-up times, respectively. It is noted that the relative movement vector may be obtained using the positions of the monitored object in the real space in a plurality of past time points. For the specific processing of calculating the approximate straight line, the method described in Japanese Patent Laid-Open No. 2001-006096, for example, may be employed.

When the relative movement vector is obtained by calculating the approximate straight line approximating the locus of relative movement of the monitored object with respect to the vehicle 10 as described above, and when presence/absence of crossing of the movement vector with the z axis is determined, it is possible to more accurately predict the possibility of contact with the monitored object, while reducing an influence of position detection error.

The following STEPS 17, 18 and 20 are carried out by the contact determining processing unit 25. In STEP 17, the contact determining processing unit 25 calculates the relative speed Vs in the Z direction (traveling direction of the vehicle 10) based on the following expression (10), and determines the possibility of contact between the vehicle 10 and the monitored object based on the following expressions (11) and (12).

$$Vs = \dfrac{Z_{10} - Z_{11}}{dT} \quad (10)$$

where Vs represents the relative speed between the monitored object and the vehicle; $Z_{10}$ represents the real space coordinate value in the Z direction of the monitored object at the previous pick-up time; $Z_{11}$ represents the real space coordinate value in the Z direction of the monitored object at the current pick-up time; and dT represents an interval between the pick-up times.

$$\dfrac{Z_{11}}{Vs} \leq Tl \quad (11)$$

where $Z_{11}$ represents the real space coordinate value in the Z direction of the monitored object at the current pick-up time; Vs represents the relative speed between the monitored object and the vehicle; and Tl represents a threshold value for a margin time.

$$|Y_{11}| \leq Hl \quad (12)$$

where $Y_{11}$ represents the real space coordinate value in the Y direction (height direction) of the monitored object at the current pick-up time; and Hl represents a threshold value for the height.

It is noted that Tl in the above expression (11) is to ensure that the possibility of contact is determined the time Tl before the expected contact time, and is set to about two to five seconds, for example. Further, Hl in the above expression (12) is to define the range in the height direction, and is set to about two times the height of the vehicle 10, for example.

If the relations of the above expressions (11) and (12) are both satisfied, the contact determining processing unit 25 determines that there is a possibility of contact, whereas it determines that there is no possibility of contact if one of the above expressions (11) and (12) is not satisfied. When it is determined that there is a possibility of contact, the process proceeds from the following STEP 18 to STEP 20, where the contact determining processing unit 25 issues a warning sound by the buzzer 6 and displays a warning by the HUD 7, and returns to STEP 1. Meanwhile, if it is determined that there is no possibility of contact, the process proceeds from STEP 18 to STEP 1, without output of the warning sound by the buzzer 6 or the display of the warning by the HUD 7.

In STEP 20, the object type determining processing unit 26 calculates the height GH of the monitored object in the real space (corresponding to the size of the object in the real space of the present invention) based on the following expression (13) using the distance Z from the monitored object. It is noted that while the distance Z may be calculated using the change rate Rate by the above expression (5), it may be detected by a distance sensor (laser radar or the like) provided separately.

$$GH = \dfrac{gh \cdot Z}{f} \quad (13)$$

where gh represents the height of the image of the monitored object; Z represents the distance between the vehicle and the monitored object; and f represents a focal distance of the infrared camera.

Here, GH corresponds to the height Y of the monitored object from the road surface. Thus, the object type determining processing unit 26 determines that the monitored object is a pedestrian when the condition of the following expression (14) is satisfied. In such a case, even if the vehicle 10 suffers pitching, the height of the monitored object from the road surface can be calculated, which enables extraction of the image of the pedestrian based on that height.

$$TH1 \leq Y \leq TH2 \tag{14}$$

where TH1 represents a threshold value of the lower limit (for example, 1 m); TH2 represents a threshold value of the upper limit (for example, 2 m); and Y represents the height of the monitored object from the road surface.

While the height may be used as the size of the present invention when determining the type of the monitored object elongated in the vertical direction like a pedestrian as described above, the width of the monitored object in the real space may be used as the size of the present invention when determining the type of the monitored object elongated in the horizontal direction like a vehicle. Further, using the height as well as the width of the monitored object in the real space as the size of the present invention will ensure more accurate determination of the type of the monitored object.

The object type determining processing unit 26 determines the type of the monitored object as described above, and changes the output of the warning sound by the buzzer 6 and the content of the warning by the HUD 7 in STEP 20 in accordance with the type.

While the infrared camera 2 is used as the camera of the present invention in the present embodiment, the present invention is applicable, even in the case of using a visible light camera, by extracting the first and second image portions from the visible light image.

Figure 6:
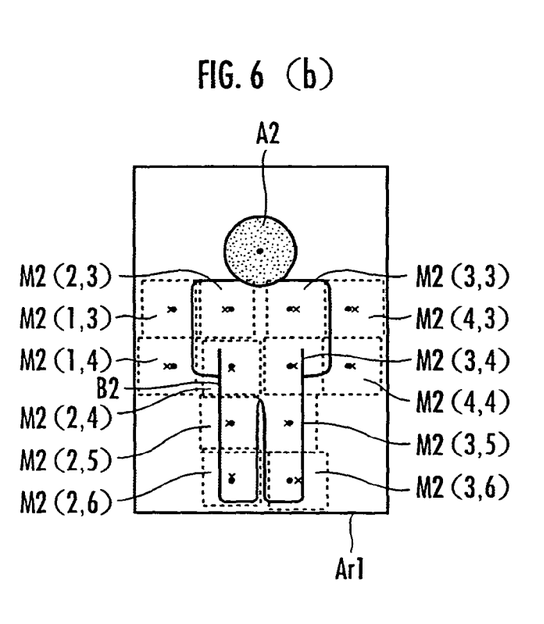
FIG. 6(a) shows 50 mask areas set by the object extracting processing unit around the first image portion.
FIG. 6(b) shows the area extracted from the comparison pattern obtained by transformation of the mask area in FIG. 6(a).
Figure 7:
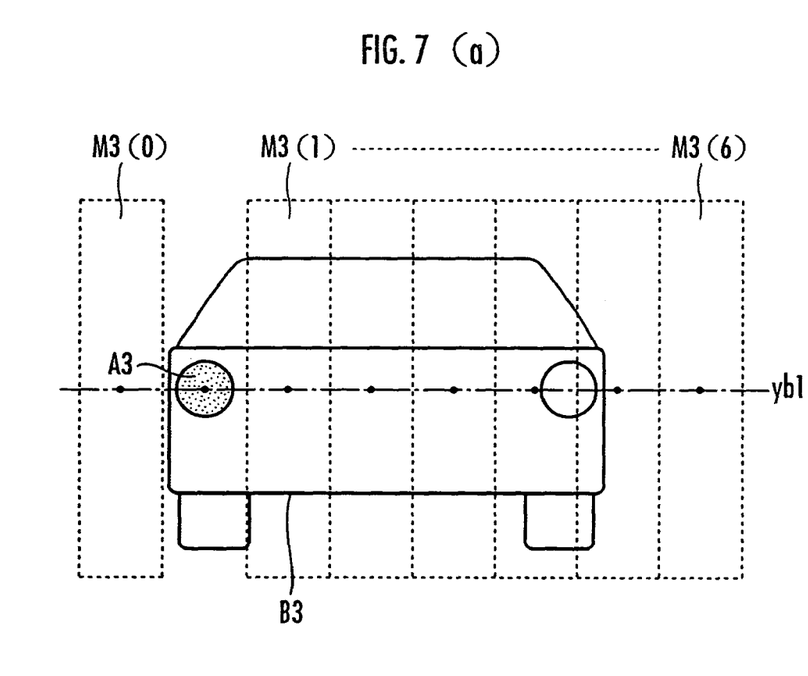
Figure 8:
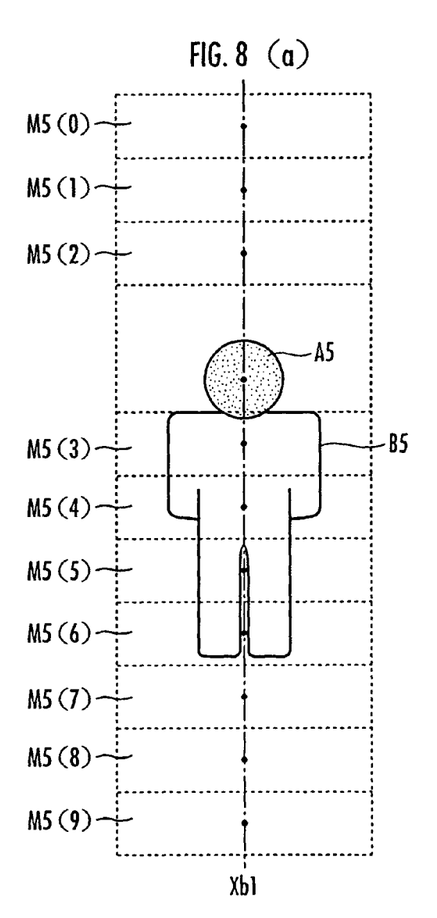

Further, while the pattern matching is carried out by the comparison pattern obtained by scaling the mask areas as shown in FIGS. 6(*a*) and 6(*b*) in the present embodiment, the pattern matching may also be carried out using the mask areas as they are as the comparison pattern, when the interval between the pick-up times is short and hence the change in size of the image portions of the monitored object is small.

What is claimed is:

1. A vehicle environment monitoring apparatus detecting a monitored object in an environment around a vehicle from an image picked up by a single imaging unit mounted on the vehicle, comprising:
    a first image portion extracting unit to extract a first image portion having a predetermined feature value from each of a first picked-up image and a second picked-up image picked up by the imaging unit at different time points;
    a change rate calculating unit to calculate a change rate in size of the first image portion extracted from the second picked-up image in respect to the first image portion extracted from the first picked-up image;
    a second image portion extracting unit to extract, from each of the first and second picked-up images, a second image portion having a change rate of not greater than a predetermined level in relative positional relation with the first image portion between the first and second picked-up images;
    an object detecting unit to detect an area including the first and second image portions in the first or second picked-up image as an image area of the same monitored object in the environment around the vehicle; and
    an object reaching time estimating unit to calculate a time until the vehicle reaches the monitored object based on the change rate in size.

2. The vehicle environment monitoring apparatus according to claim 1, further comprising:
    a real space distance grasping unit to grasp a distance between the vehicle and a position in a real space corresponding to the image area including the first and second image portions; and
    an object type determining unit to calculate a size of the object in the real space corresponding to the image area including the first and second image portions using the distance grasped by the real space distance grasping unit, and to determine a type of the object based on the size.

3. The vehicle environment monitoring apparatus according to claim 2, wherein the object type determining unit calculates at least one of a height and a width of the object in the real space as a size of the object in the real space corresponding to the image area including the first and second image portions.

4. A vehicle environment monitoring apparatus detecting a monitored object in an environment around a vehicle from an image picked up by a single imaging unit mounted on the vehicle, comprising:
    a first image portion extracting unit to extract a first image portion having a predetermined feature value from each of a first picked-up image and a second picked-up image picked up by the imaging unit at different time points;
    a change rate calculating unit to calculate a change rate in size of the first image portion extracted from the second picked-up image in respect to the first image portion extracted from the first picked-up image;
    a mask area setting unit to set a mask area in the first picked-up image in a predetermined position around the first image portion;
    a second image portion extracting unit to set a comparison pattern obtained by reducing or enlarging the mask area by the change rate in size, to extract an area having a highest degree of correlation in shape with the comparison pattern from the second picked-up image, and to extract the extracted area as a second image portion of the second picked-up image and also to extract the mask area as a second image portion of the first picked-up image, when a displacement amount between a relative position of a centroid of the extracted area in respect to the first image portion of the second picked-up image and a relative position of a centroid of the mask area in respect to the first image portion in which an area including the first image portion and the mask area in the first picked-up image is reduced or enlarged by the change rate in size, is not greater than a predetermined threshold value; and
    an object detecting unit to detect an area including the first and second image portions in the first or second picked-up image as an image area of the same monitored object in the environment around the vehicle.

5. The vehicle environment monitoring apparatus according to claim 4, wherein at least one of an area upward of the first image portion and an area downward of the first image portion is defined as the mask area.

6. The vehicle environment monitoring apparatus according to claim 4, wherein at least one of an area leftward of the first image portion and an area rightward of the first image portion is defined as the mask area.

7. The vehicle environment monitoring apparatus according to claim 4, wherein
    the imaging unit is an infrared camera,
    the first image portion extracting unit extracts the first image portion from an infrared gray scale image picked up by the imaging unit, and the second image portion extracting unit extracts the second image portion by correlation processing with the mask area in the gray scale image.

* * * * *